(12) United States Patent
Garland

(10) Patent No.: US 9,625,084 B2
(45) Date of Patent: Apr. 18, 2017

(54) SYSTEM FOR MOUNTING CAMERA EQUIPMENT

(71) Applicant: Camera Goat LLC, Boulder, CO (US)

(72) Inventor: Jeffery Garland, Boulder, CO (US)

(73) Assignee: Camera Goat, LLC, Boulder, CO (US)

( * ) Notice: Subject to any disclaimer, the term of this patent is extended or adjusted under 35 U.S.C. 154(b) by 320 days.

(21) Appl. No.: 14/319,682

(22) Filed: Jun. 30, 2014

(65) Prior Publication Data

US 2015/0009476 A1 Jan. 8, 2015

Related U.S. Application Data

(60) Provisional application No. 61/841,992, filed on Jul. 2, 2013.

(51) Int. Cl.
| | |
|---|---|
| *F16M 11/00* | (2006.01) |
| *F16M 11/20* | (2006.01) |
| *F16M 11/24* | (2006.01) |
| *F16M 11/42* | (2006.01) |
| *G03B 17/56* | (2006.01) |

(52) U.S. Cl.
CPC ......... *F16M 11/2085* (2013.01); *F16M 11/24* (2013.01); *F16M 11/425* (2013.01); *G03B 17/561* (2013.01)

(58) Field of Classification Search
CPC ........ F16M 11/00; F16M 11/42; F16M 11/24; F16M 11/2085; G03B 17/561; B62B 5/0083
USPC ......................................................... 352/243
See application file for complete search history.

(56) References Cited

U.S. PATENT DOCUMENTS

| | | | | |
|---|---|---|---|---|
| 4,699,484 A * | 10/1987 | Howell | ................ | F16M 11/10 352/132 |
| 5,711,227 A * | 1/1998 | Johnson | ................ | E01B 23/00 104/106 |
| 6,775,475 B1 * | 8/2004 | Traver | ................ | G03B 15/00 352/243 |
| 7,794,088 B1 * | 9/2010 | Saad | ................ | G03B 17/00 248/298.1 |
| 8,142,019 B2 * | 3/2012 | Hernandez | ............ | F16M 11/42 348/373 |
| 8,721,199 B1 * | 5/2014 | Hart | ................ | F16M 11/045 396/428 |
| 8,858,098 B1 * | 10/2014 | Hart | ................ | F16M 11/045 396/428 |
| 9,094,590 B2 * | 7/2015 | Wood | ................ | H04N 5/2251 |
| D748,640 S * | 2/2016 | Hart | ................ | D14/451 |

(Continued)

*Primary Examiner* — William C Dowling
(74) *Attorney, Agent, or Firm* — Neugeboren O'Dowd PC

(57) ABSTRACT

This disclosure describes a modular bridging structure and a system for using that structure. The bridging structure has a channel configured to receive a portion of an elongate rail, the channel being configured to receive the elongate rail substantially perpendicularly to a longitudinal axis of the modular bridging structure, and a rail fastener securing the received rail within the channel. Additionally, the modular bridging structure has a leg receiver configured to receive an elongate leg section such that the leg section is attached through a bottom side of the modular bridging structure. There is a leg fastener that secures the received leg section to the modular bridging structure such that the securing point of the fastener is adjustable along a plurality of points along each leg section.

20 Claims, 13 Drawing Sheets

(56) References Cited

U.S. PATENT DOCUMENTS

2009/0309986 A1* 12/2009 Mayer .................... F16M 11/42
348/208.99
2015/0234258 A1* 8/2015 Hida ....................... F16M 11/20
396/428

* cited by examiner

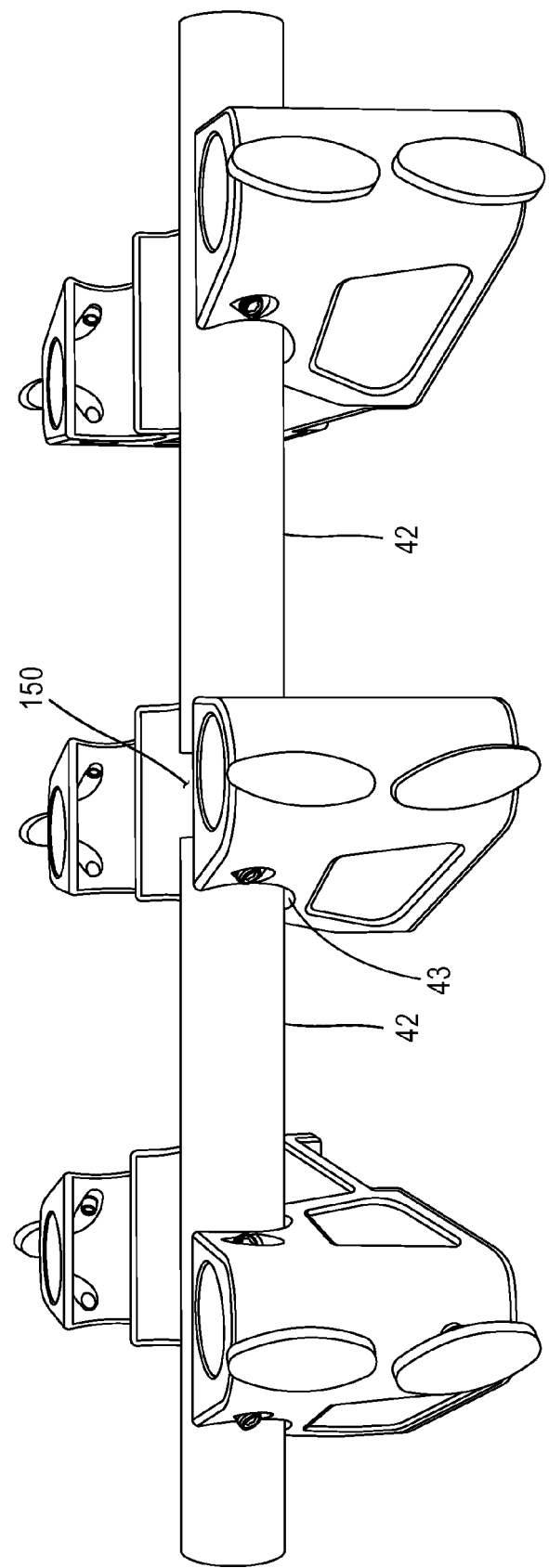

SYSTEM FOR MOUNTING CAMERA EQUIPMENT

CROSS REFERENCE TO RELATED APPLICATIONS

The present application for patent claims priority to Provisional Application No. 61/841,992 entitled SYSTEM FOR MOUNTING CAMERA EQUIPMENT filed Jul. 2, 2013, and assigned to the assignee hereof and hereby expressly incorporated by reference herein.

FIELD OF THE DISCLOSURE

The present disclosure relates generally to equipment used in the motion picture industry to support and dynamically mount cameras and accessories for use during production. In particular, but not by way of limitation, the present disclosure relates to systems and apparatuses for mounting camera equipment that allow cameras to slide.

BACKGROUND OF THE DISCLOSURE

In film production, it is often desirable to take a camera shot while moving the camera mount laterally, rather than keeping the camera still or simply rotating a camera about an axis. Such shots are generally known as dolly shots, and as specific kind of dolly shot where the camera slides smoothly alongside a moving subject are known as dynamic slider shots. Dolly shots, and particularly dynamic slider shots typically add to the production value of a film.

One current way of filming a dynamic slider shot is to use large pieces of mounting equipment that are secured to stationary objects. These known pieces of equipment typically require three or four members of the camera crew (known as "grips") approximately one to one-and-a-half hours to set up. In addition, the equipment itself usually costs tens of thousands of dollars. The labor, time, and expense involved in setting up a dynamic slider shot are disadvantageous, and often prohibitive, to filmmakers with modest budgets. Additionally, existing slider systems usually come in set lengths of not more than four feet. Yet another problem that exists with currently available dolly shot equipment is that it is difficult to set up and use on non-level surfaces, especially those that exist in natural outdoor landscapes. Therefore, there exists a need for systems, methods, and apparatuses to remedy these deficiencies.

SUMMARY OF THE DISCLOSURE

Exemplary aspects of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some aspects of the disclosure may be characterized as a modular bridging structure. A modular bridging structure can include a first end, a second end, a top side and a bottom side. The modular bridging structure can include a channel configured to receive a portion of an elongate rail. The channel can be configured to receive the elongate rail substantially perpendicularly to a longitudinal axis of the modular bridging structure. The modular bridging structure can also include a rail fastener that secures the received rail within the channel. The modular bridging can also include a leg receiver configured to receive an elongate leg section such that the leg section is attached through a bottom side of the modular bridging structure, and a leg fastener securing the received leg section to the modular bridging structure such that the securing point of the fastener is adjustable along a plurality of points along each leg section.

Other aspects of the disclosure can be characterized as a system for mounting a camera. The system can include at least two modular bridging structures, wherein each modular bridging structure comprises channels for receiving rails and leg receivers for receiving legs. The system can also include at least two rails attached to the bridging structures. Additionally, the system can include at least two legs attached to each of the at least two bridging structures, wherein each of the legs is independently adjustable in height from the others. The system can also include a camera-mounting wheeled tray configured to roll along the rails, and a camera.

BRIEF DESCRIPTION OF THE DRAWINGS

FIG. 13 is a side perspective view of three modular bridging structures connected to two rails on one side of each support structure.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
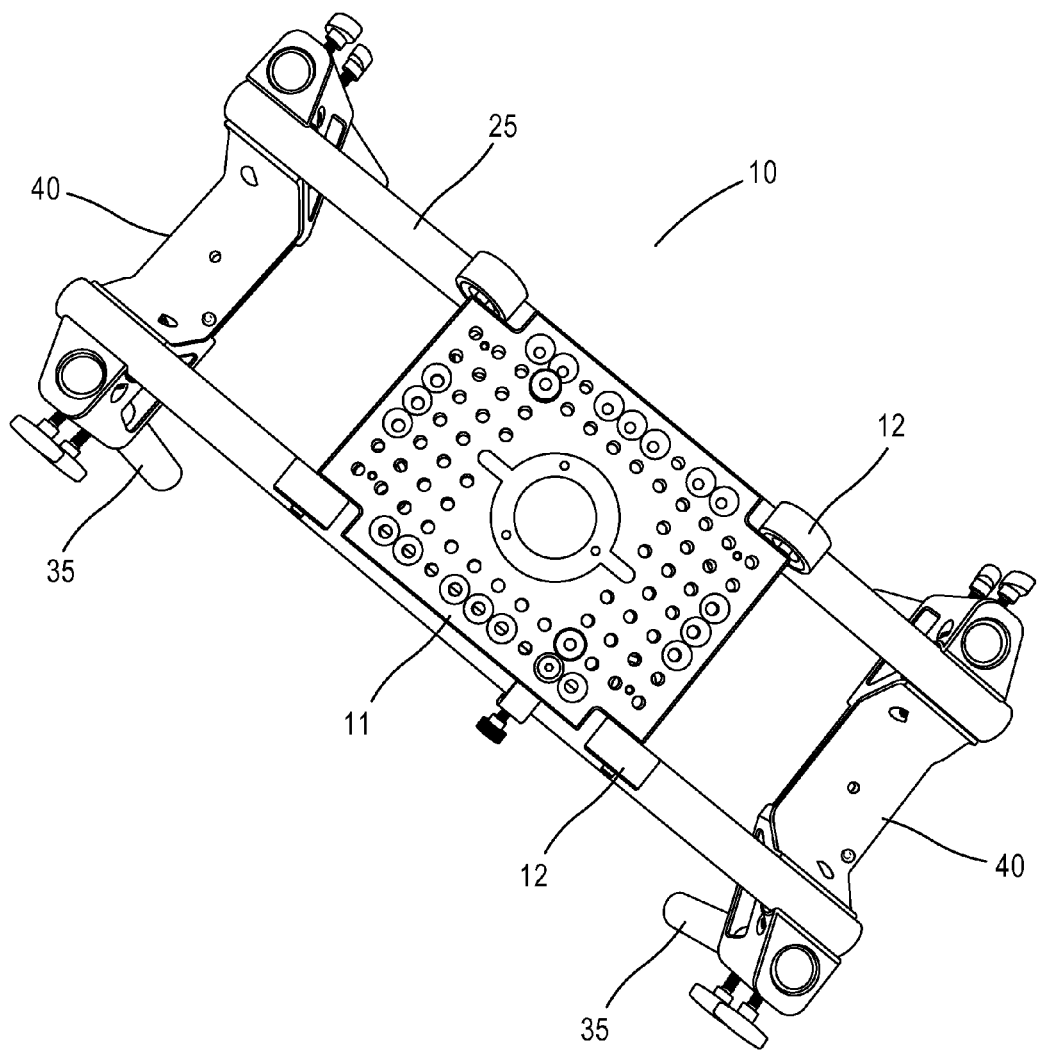
FIG. 1 is a top perspective view of an embodiment of the system, including modular bridging structures, rails, and a camera-mounting wheeled tray.

Referring to FIG. 1, shown is a dynamic slider shot system 10. The system 10 shown is comprised of a camera-mounting wheeled tray 11 (referred to herein as "tray") with wheels 12, rails 25, legs 35, and two modular bridging structures 40. The modular bridging structures 40 act as a rigid bar between the rails, and also serve to connect the rails 25 and legs 35 in a bridge-like configuration.

Figure 2:
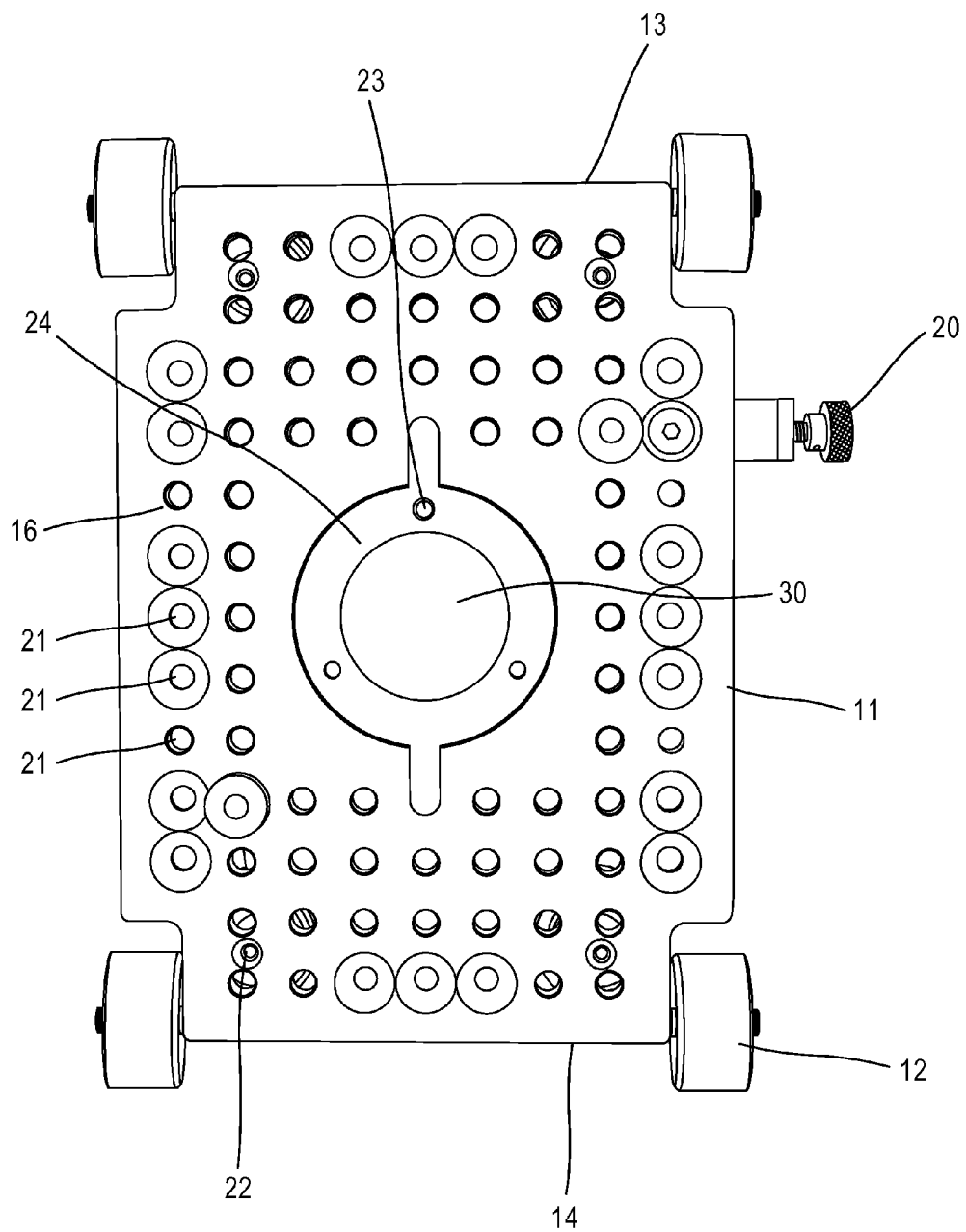
FIG. 2 is a top view of the camera-mounting wheeled tray.
Figure 3:
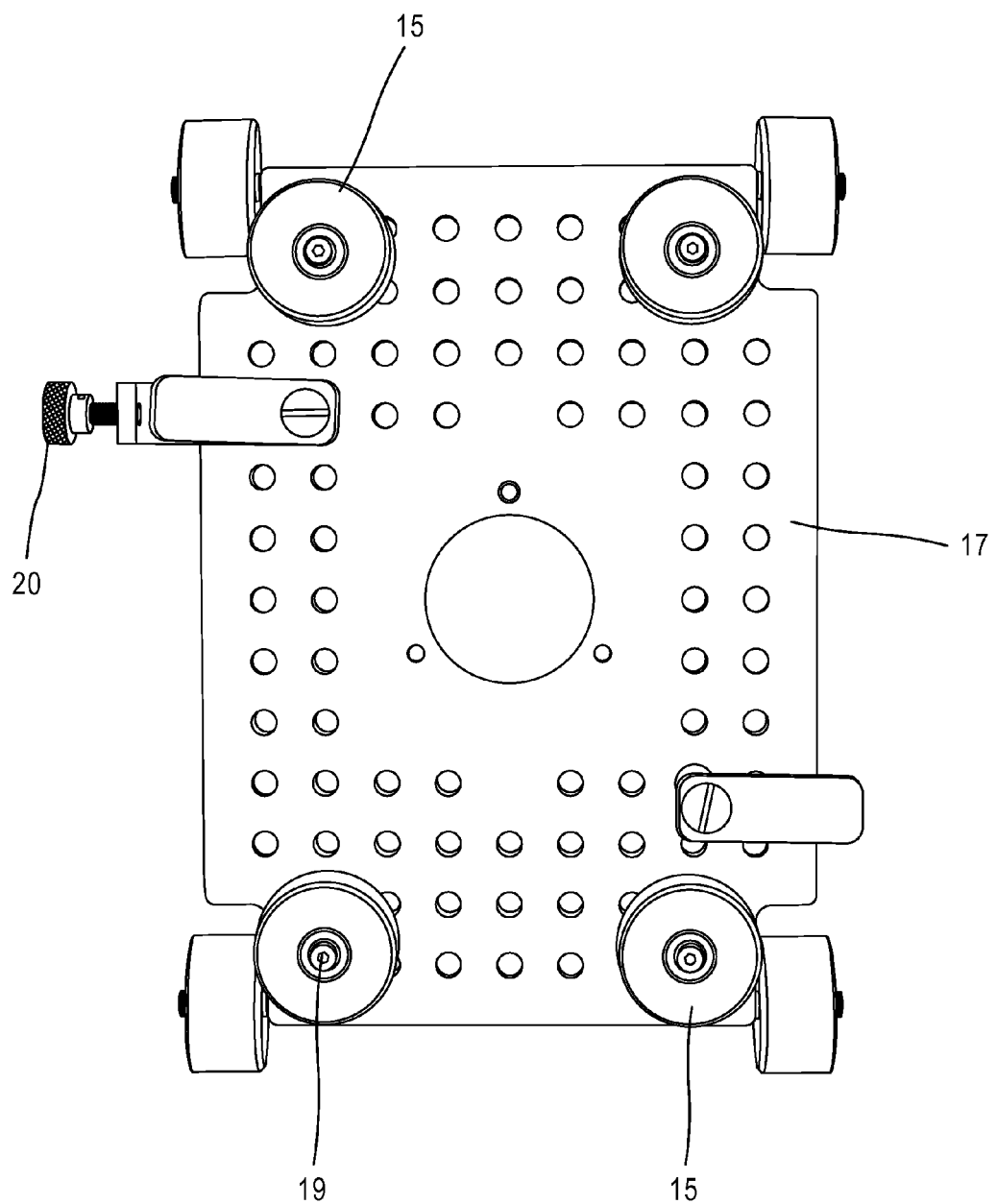
FIG. 3 is a bottom view of the camera-mounting wheeled tray.
Figure 4:
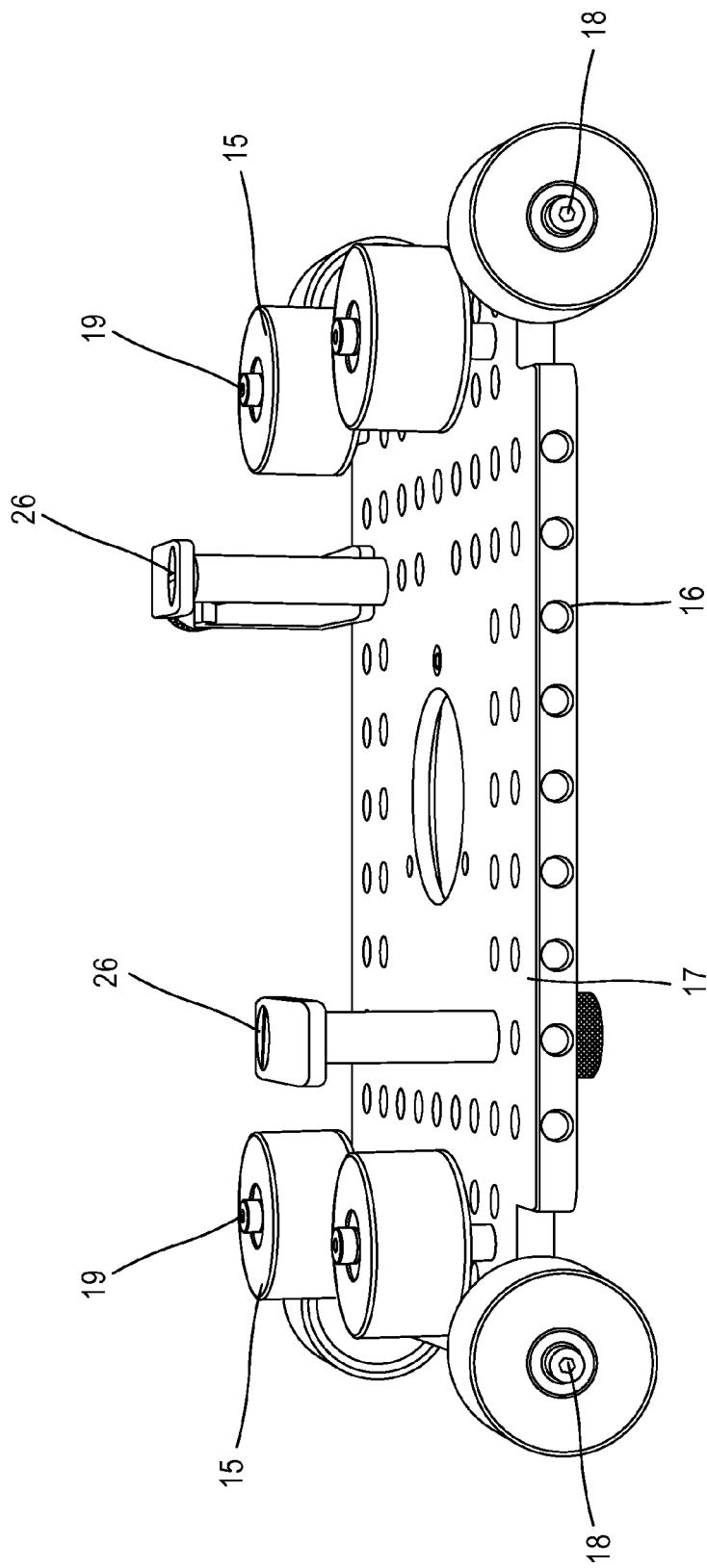
FIG. 4 is a bottom perspective view of the camera-mounting wheeled tray, showing tray safeties engaged in particular directions.

Referring to FIGS. 2, 3, and 4, shown is the tray 11 with wheels 12. The tray 11 has a substantially flat planar surface, and a top side 16 and bottom side 17. In the embodiment shown, there are four wheels 12, two of which are located at a first end 13 and two of which are located at a second end 14 of the tray 11. However, different embodiments may have fewer or more than four wheels, and they may be located in places other than the ends of the tray. The wheels 12 are attached to axes 18, and the axes are substantially parallel to the flat planar surface of the tray 11. The wheels 12 rotate around the respective axes 18 to which they are attached, and rotate at substantially a right angle in relationship to the flat planar surface of the tray 11.

FIGS. 3 and 4 show guide wheels 15 attached to the bottom side 17 of the tray 11. The guide wheels 15 are attached to axes 19. The axes 19 are substantially perpendicular to the flat planar surface of the tray 11. The guide wheels 15 rotate in a substantially parallel orientation in relation to the flat planar surface of the tray 11. In the embodiment shown, there are four guide wheels 15 on the tray 11, but in other embodiments there may be fewer or more guide wheels 15.

FIGS. 2 and 3 show a threaded bolt 20 which is used for securing a friction brake, which will be described presently. The tray 11 has a circular opening 30 located substantially in the middle of the tray 11. This opening 30 can be a film industry standard opening with a four-inch diameter known as a Mitchell mount, and can be used for mounting a camera. Surrounding the opening is a circumferential flange 24, which contains a plurality of through holes 23 that are used for mounting various ball heads, which are common attachment points for various cameras. The plurality of through holes 23 allow for the attachment of cameras ranging from large professional studio versions to small personal versions. The circumferential flange 24 may be configured in various ways to support various kinds of cameras available in the industry, and may include features such as ridges, different geometric shapes, and radially extending channels, for example. The tray 11 also has a plurality of through holes 21 on the surface that are used for camera accessories and mounting options.

Figure 5:
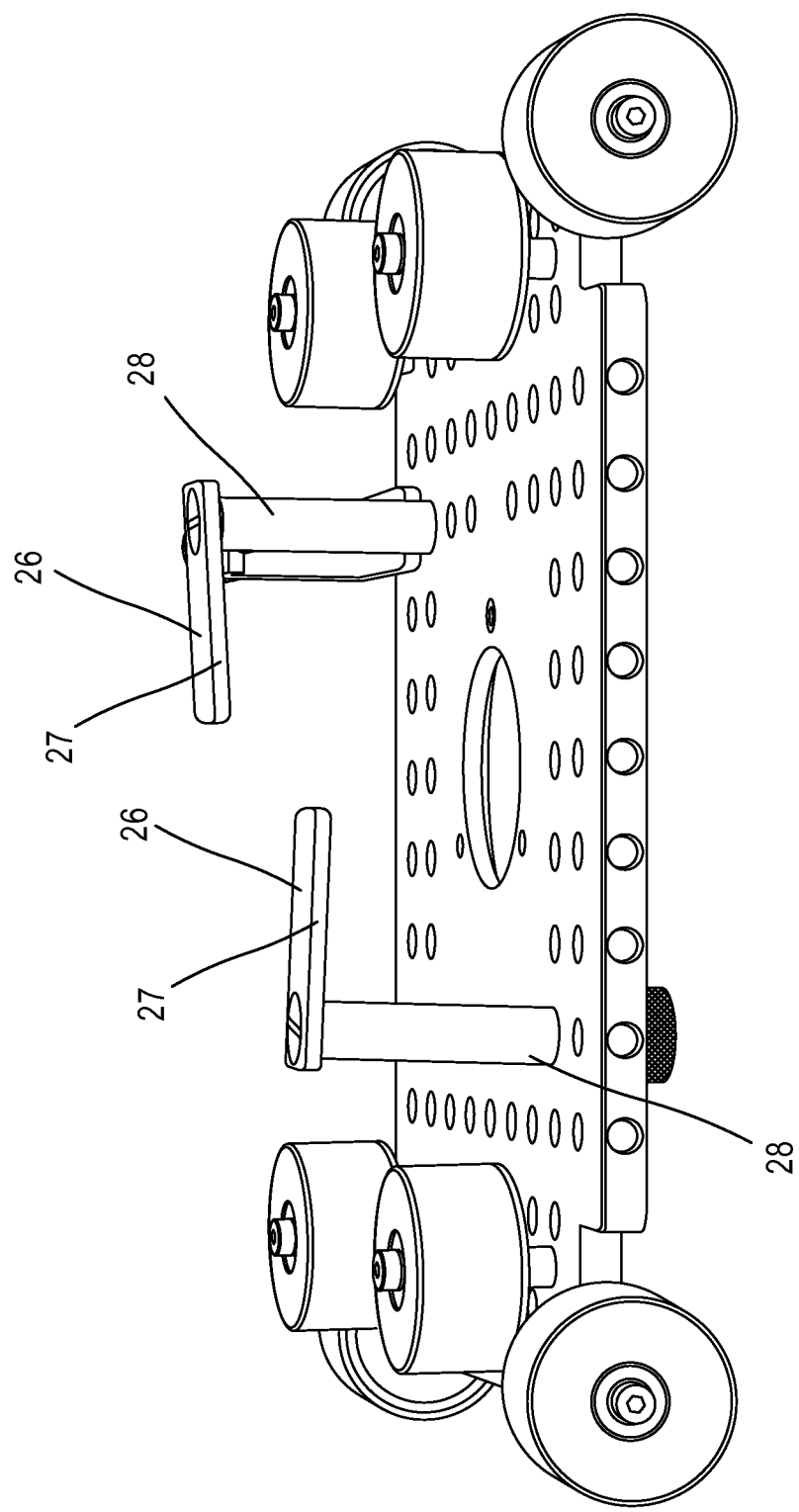
FIG. 5 is a bottom perspective view of the camera-mounting wheeled tray, showing tray safeties engaged in a different directions than in FIG. 4.

Referring specifically to FIGS. 4 and 5, tray safeties 26 are located on the bottom of the. The embodiment depicted shows two tray safeties 26, but other embodiments may have more or fewer. The tray safeties 26 have vertical sections 28 which are substantially perpendicular to the flat planar surface of the tray 11, and horizontal sections 27, which are substantially parallel to the flat planar surface of the tray 11. The vertical sections 28 can rotate at their points of attachment to the tray. Alternatively, the horizontal sections 27 can rotate at their points of attachment to the vertical sections 27. The horizontal sections 27 are disposed at a distance from the flat planar surface of the tray that allows a rail section to be received, with very little additional clearance, between the flat planar surface and the horizontal section 27. When horizontal section 27 is rotated over a rail section, it prevents the tray 11 from being lifted off of the rails by an unbalanced weight that would otherwise make the tray 11 topple over.

Figure 6:
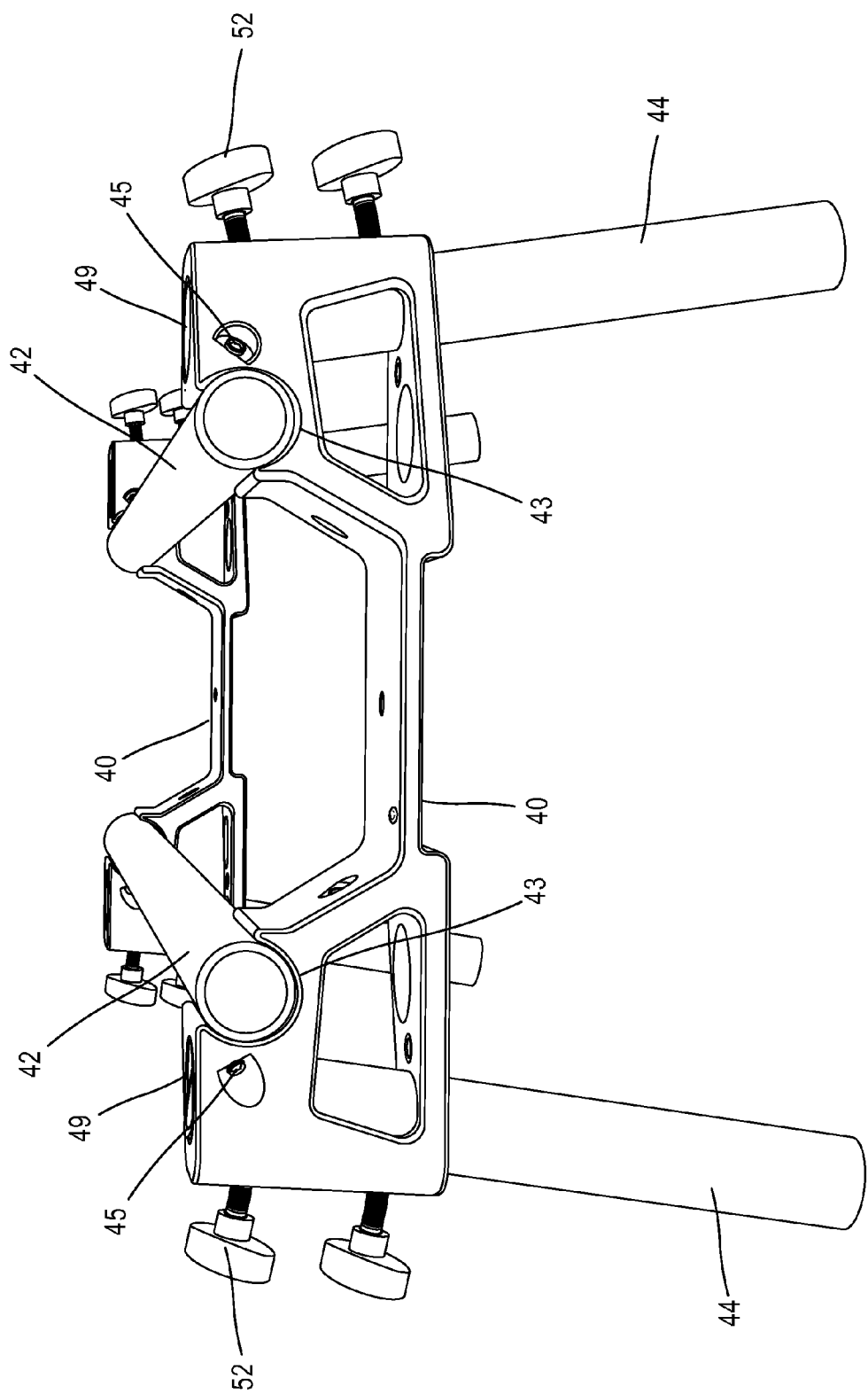
FIG. 6 is a side perspective view of two modular bridging structures connected to two rails and four adjustable legs.

Referring now to FIG. 6, shown is a system in which two modular bridging structures 40 are joined together with rail sections 42 and leveling legs 44. Each modular bridging structure 40 has a plurality of rail channels that are configured to receive rail sections 42. In the embodiment shown, each modular bridging structure 40 has two rail channels 43. In one embodiment, the rail channels 43 are sized to snugly fit commonly found structures that can be used as the rail sections 42. Rail sections 42 can be made of any suitable, substantially rigid material that fits within the rail channels 43. Examples are PVC pipe or cylindrical aluminum fencing rails found at hardware stores. Rail sections 42 can be any length the user desires, limited only by the structural support necessary for the weight of the equipment. Long rail sections that are required to support standard camera equipment should be strong and rigid enough that they do not bend substantially under the weight of the camera and tray. Commonly found PVC pipe and aluminum fencing pipes would ideally fit within the rail channels 43, although a variety of rail channel sizes and rail section sizes are contemplated. A rail channel 43 that is sized to fit commonly found sizes of pipes would allow a filmmaker to travel to a film set with just the modular bridging structure 40 and the tray 11 and buy inexpensive, common materials for the rails and legs at hardware stores near the location.

Figure 10:
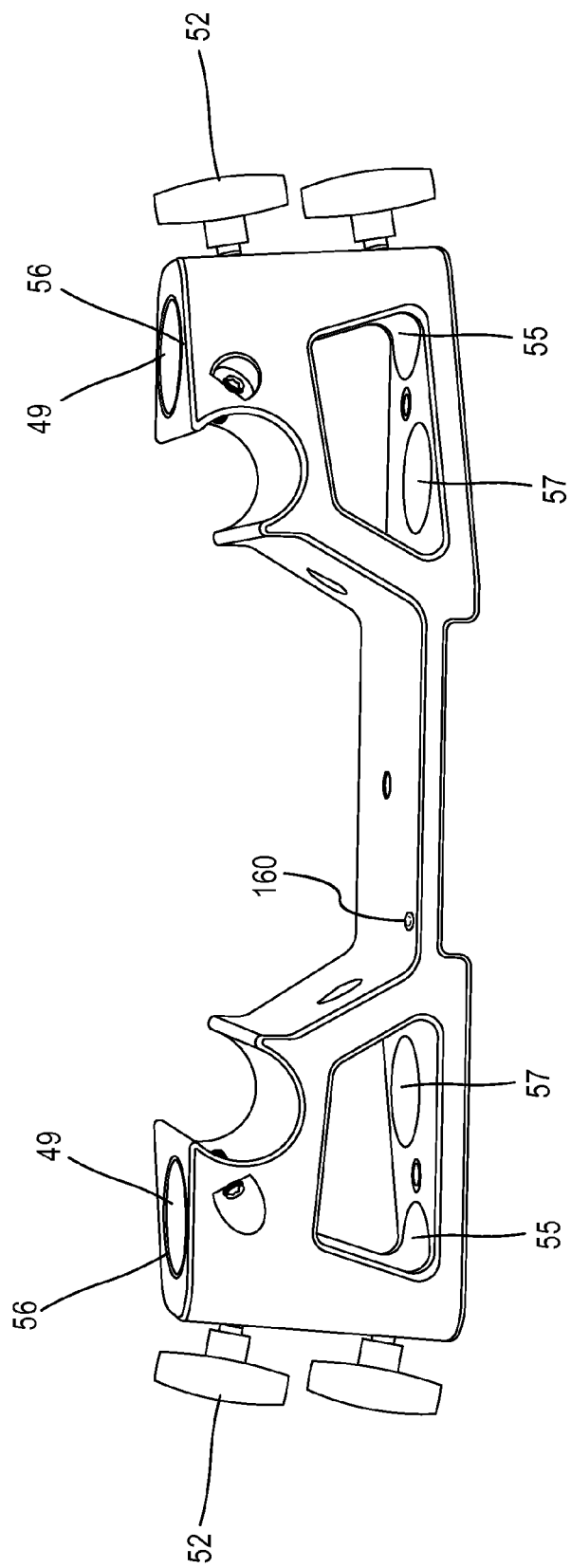
FIG. 10 is a front view of the modular bridging structure.

Each rail channel 43 has at least one hole through the side of the channel that allows a rail fastener 45 to engage with the rail section 42 and tighten it within the rail channel 43. Each modular bridging structure 40 also has leg holes at each end to receive legs 44. There are three different types of leg holes on each modular bridging structure 40 in the embodiment depicted. Referring briefly to FIG. 10, there are bottom leveling leg holes 55, top leveling leg holes 56, and standard leg holes 57. Bottom leveling leg holes 55 and top leveling leg holes 56 comprise the ends of a leg receiver 49 that receives leveling legs 44. They are called "leveling" legs because they can be adjusted such that the modular bridging structure 40, rail sections 42, and tray 11 can stay level in relation to a set plane even if the terrain beneath the length of the rails is uneven. The leg receiver 49 allows the leveling legs to pass through the top of the modular bridging structure 40 in case a particular leveling leg 44 needs to be shortened. Leveling legs 44 can be made of any suitable, substantially rigid material. Examples are PVC pipe or cylindrical aluminum fencing rails commonly found at hardware stores. Such materials come in standard sizes and would ideally be sized to fit snugly within the bottom and top leveling holes 55 and 56, although leveling legs of different sizes are contemplated. Adjustment knobs 52 are provided to secure the leveling legs 44 within the leg receiver 49. Adjustment knobs 52 in this embodiment are two large thumb screws which may be tightened manually. Adjustment knobs 52 may be loosened such that the end of the screw disengages completely with the leveling leg 44, or tightened such that the end of the screw engages with the leveling leg 44 such that the leg cannot move within the leg receiver.

Figure 7:
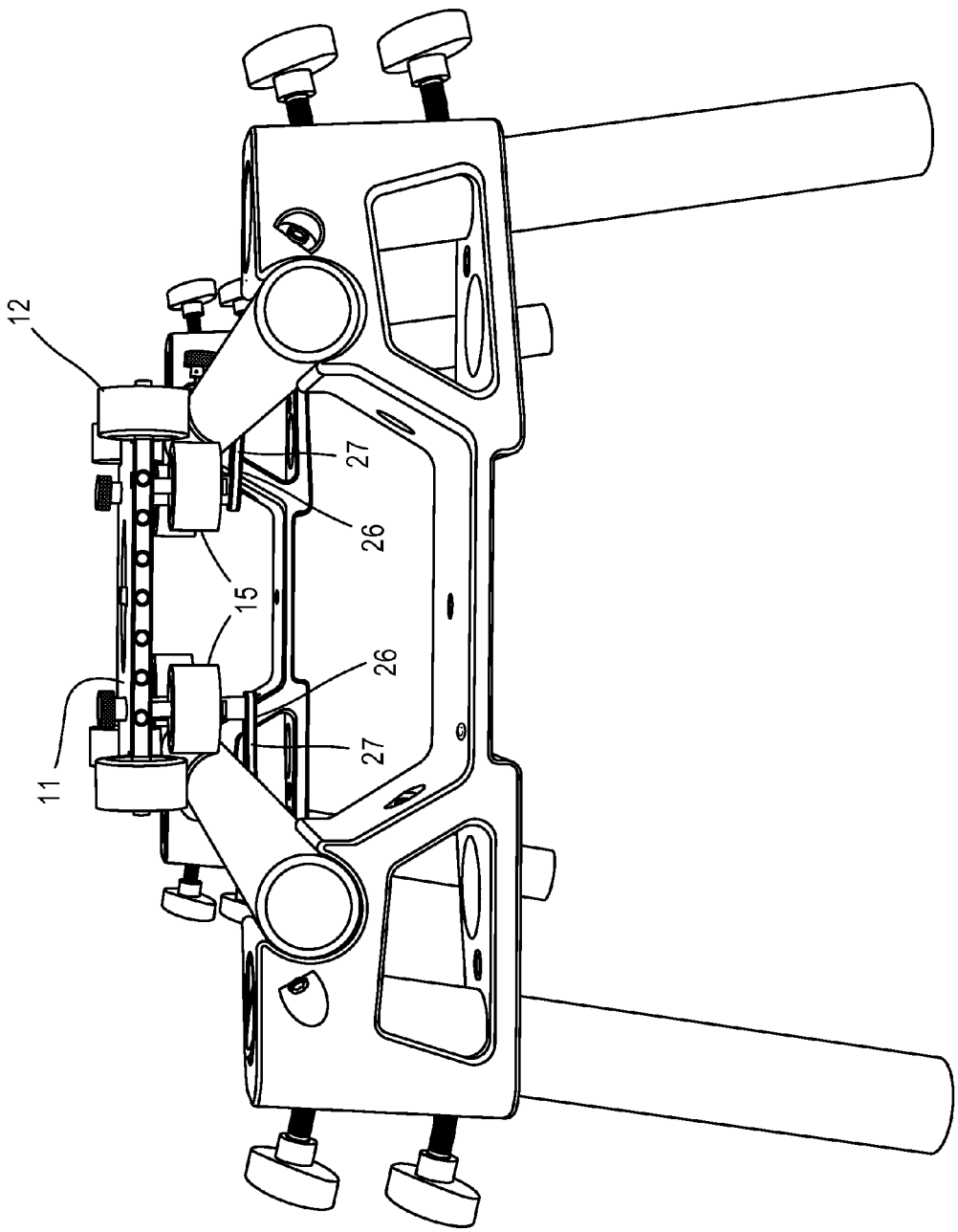
FIG. 7 is a side perspective view of the system in FIG. 1.

Referring now to FIG. 7, shown is the tray 11 with wheels 12 and 15 mounted in an operable position on the rail sections 42, between two modular bridging structures 40. The tray safeties 26 are positioned such that the horizontal sections 27 hover over the rail sections 42, which would effectively prevent the tray 11 from tipping over if it were bearing an unbalanced load. However, since the horizontal sections 27 do not touch the rail, they simultaneously allow the tray 11 to roll unimpeded along the rail sections 42 between the modular bridging structures 40.

Figure 8:
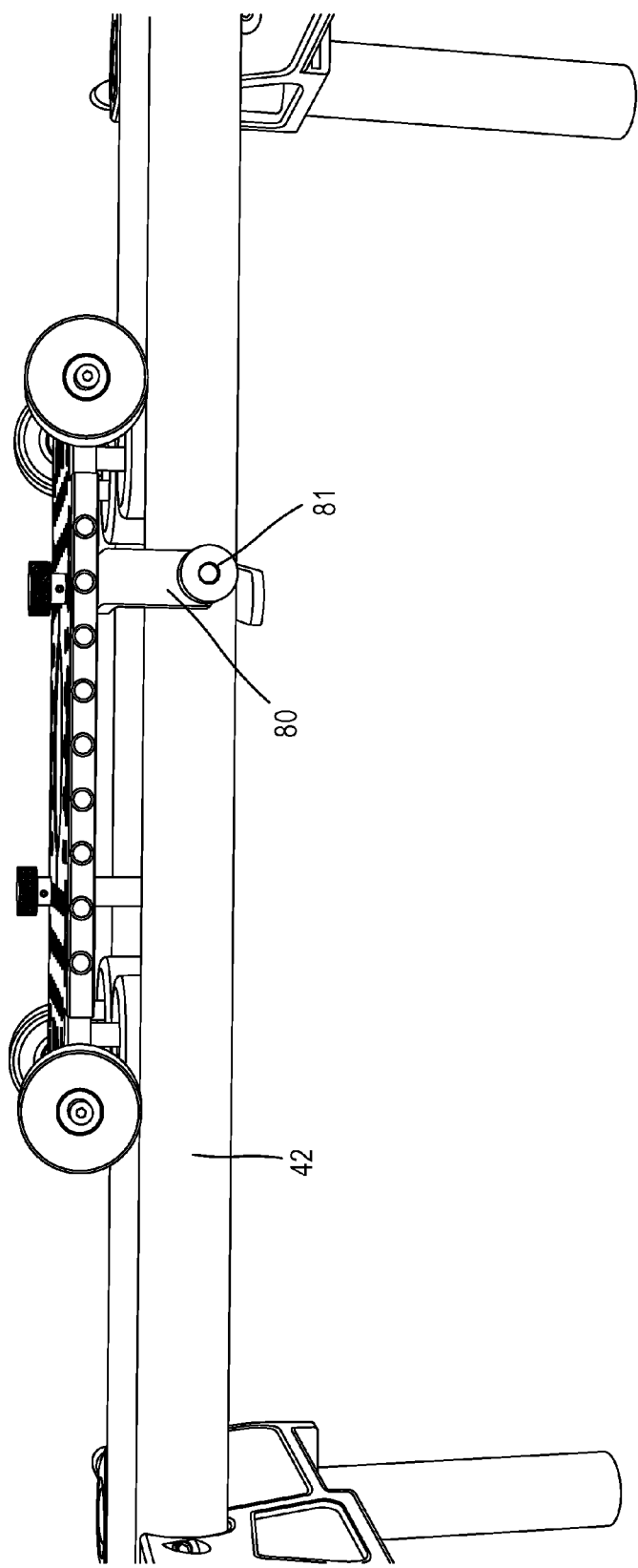
FIG. 8 is a side view of the camera-mounting wheeled tray mounted on the rails.
Figure 9:
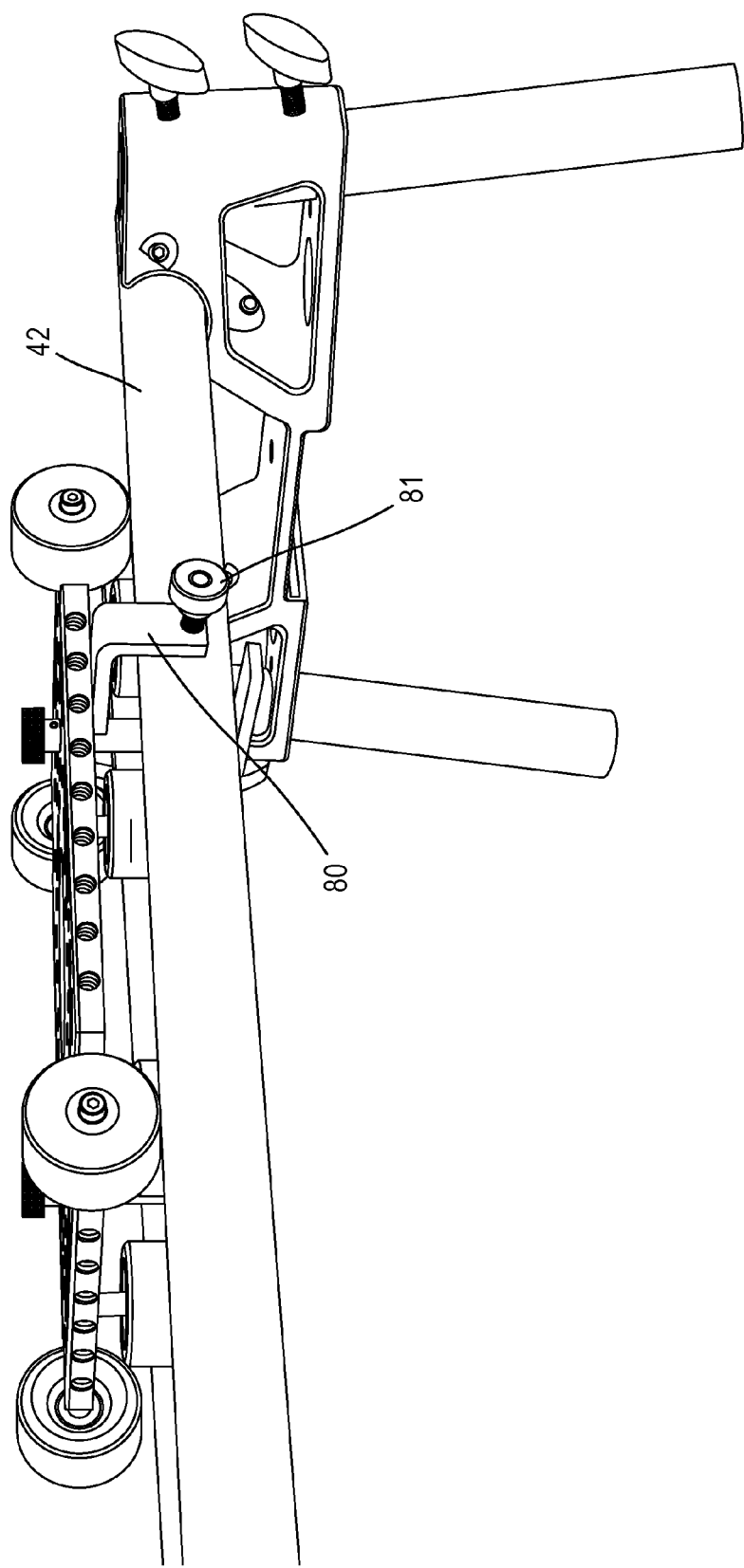
FIG. 9 is a side perspective view of FIG. 8, showing particularly a friction brake apparatus on the tray.

Referring now to FIGS. 8 and 9, shown is the tray 11 mounted as in FIG. 7, with a view of the friction brake 20. In this embodiment depicted, the friction brake 20 is comprised of an L-bracket 80 which is fixedly mounted on the tray 11. A threaded bolt 81 is attached to the L-bracket 80. In some embodiments, the end of the threaded bolt 81 can be smooth or beveled, such that when the threaded bolt 81 is fully tightened, the pressure it puts on the rail section 42 is sufficient to prevent the tray 11 from sliding at all. When the threaded bolt 81 is not fully tightened, it does not create any contact with the rail section 42, and the tray 11 can slide freely. Alternatively, in other embodiments, there can be a brake pad (not shown) attached to the end of the threaded bolt 81 that sits between the bracket 80 and the rail section 42. This brake pad can be made of, for example, polyurethane, but other suitable braking materials can be used. The threaded bolt 81 can be manually adjusted to create pressure between the brake pad and the rail section 42. Sometimes, users will construct the dynamic slider shot rail system so that one end is higher than the other, creating an incline. The user may want to allow the tray and mounted camera to move down the rails using gravity rather than manually pushing or pulling the tray and camera. This allows the equipment to accelerate uniformly. The friction brake 20 can be to adjust the fall rate, or speed, of the tray and camera down the rail system. The threaded bolt 81 that is configured with a brake pad can also be tightened enough so the tray 11 is secured in a stationary position.

Referring now to FIG. 10, shown is the modular bridging structure 40 with a bubble level 160. The bubble level 160 can be used to visually confirm whether the modular bridging structure 40 is level in relation to at least one plane. Also shown are the standard leg holes 57 allow the modular bridging structure 40 to be used with legs and stands that are currently available in the industry. In the embodiment depicted, the standard leg holes 57 allow legs to be inserted until the top of the leg abuts the structure underneath the rail channel 43. A user may want to use standard leg holes 57 with commercially-available legs on a surface that is level. A user may also want to use the standard leg holes 57 on an industry standard vehicle-mounted camera platform. Examples of vehicle mounted platforms are those commonly known as "lunch trays" mounted on the sides of cars (the cars being commonly known as "picture vehicles"), or those platforms mounted on top of a truck, (the trucks commonly known as "shot makers"). Because the modular bridging structure 40 has both standard leg holes and leg receivers 49, a user can use the same modular bridging structure 40 for level dolly shots, inclined dolly shots, vehicle-mounted shots, and many other kinds of shots. This functionality can reduce the amount of equipment the user needs over the course of a variety of film projects.

Figure 11:
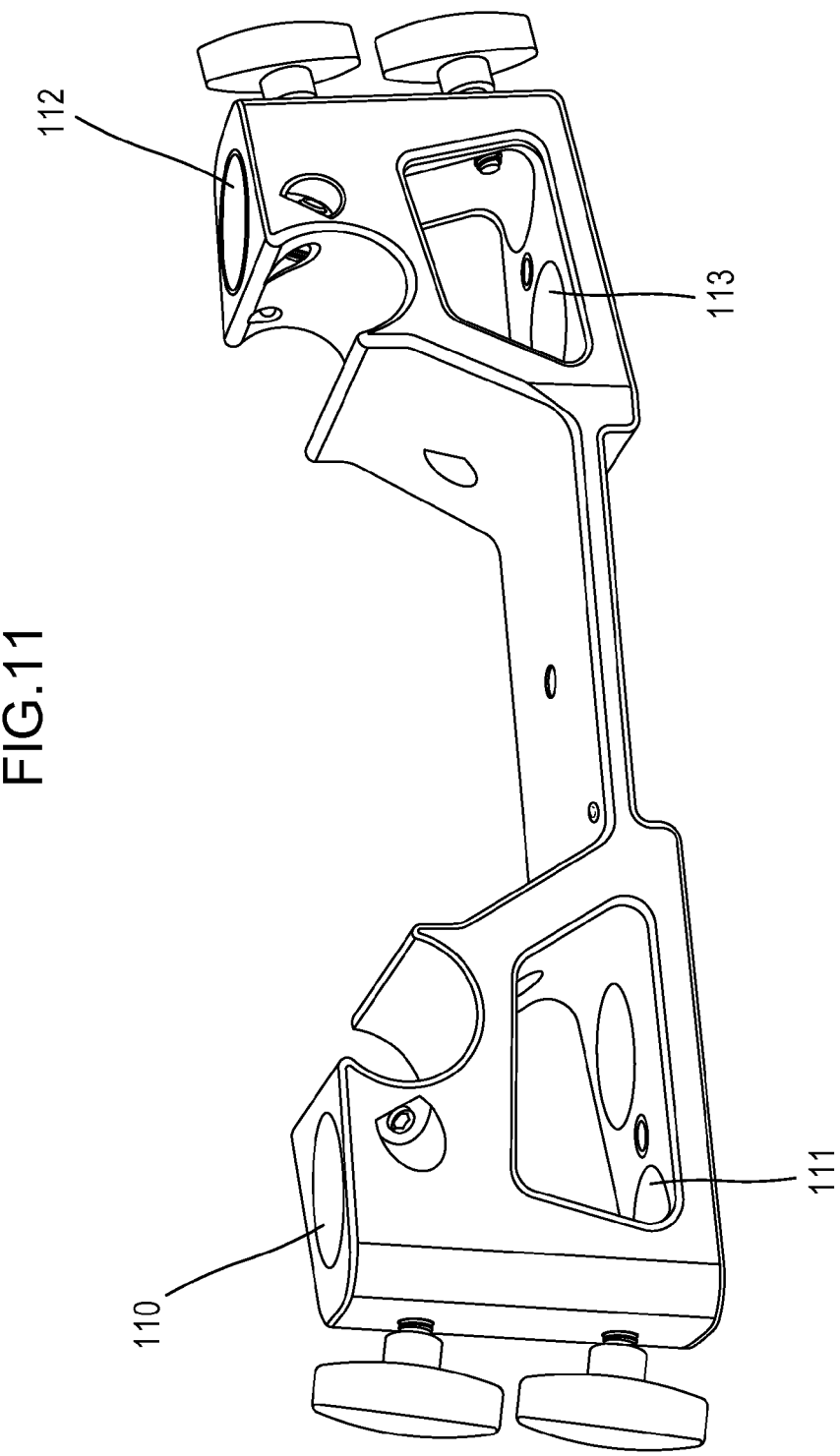
FIG. 11 is a front perspective view of FIG. 10.

Referring now to FIG. 11, this embodiment of the modular bridging structure depicts a total of four outer leg holes 110, 111, 112, and 113. Leg holes 110 and 111 are positioned to receive a leg section (not shown). In this embodiment, the top leg hole 110 is offset from the bottom leg hole 111, with the top leg hole 110 being disposed closer to the center of the modular bridging structure 40 than the bottom leg hole 111. It is contemplated that these leg holes could be aligned vertically, with no offset, or at a greater angle than shown in this embodiment, or that the leg angle created by the offset of the holes could be adjustable. The presently depicted embodiment allows for stability of the rail system when long legs are used. When a user wants to position the slider shot several feet off the ground, the angle of the legs is desirable to create a wider base of support the higher the modular bridging structure 40 is connected. In the embodiment depicted, leg holes 112 and 113 are situated in relation to each other in a similar manner as leg holes 110 and 111.

Figure 12:
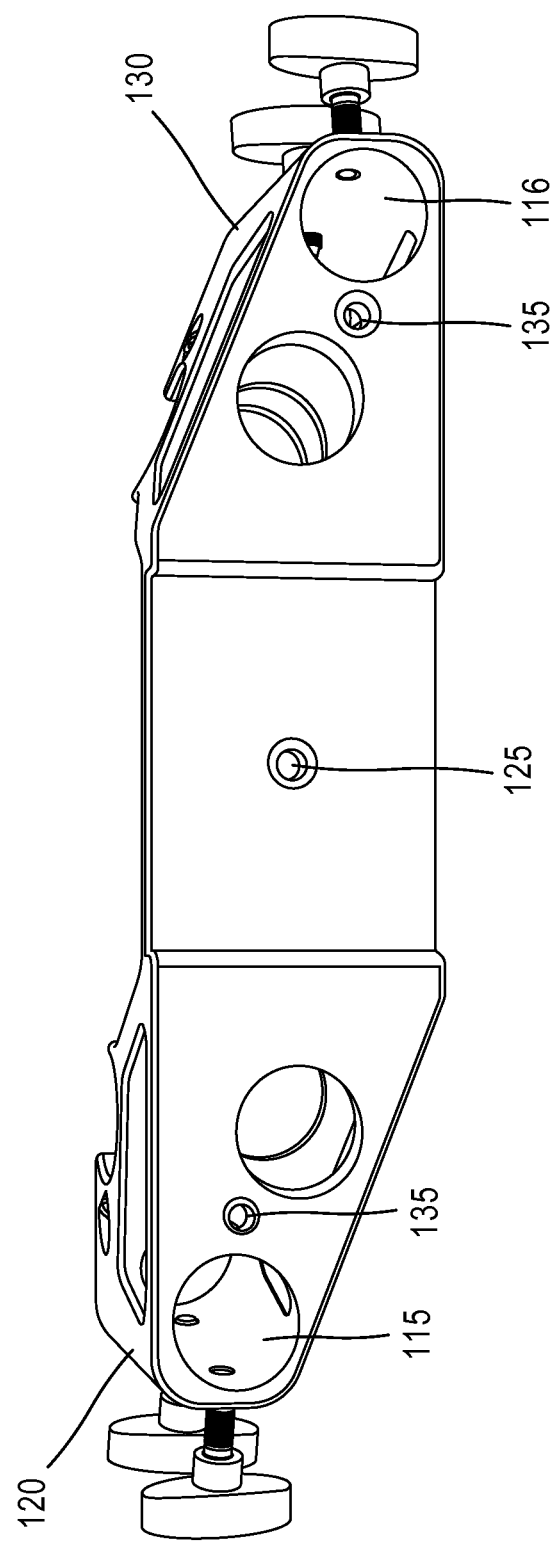
FIG. 12 is a bottom view of FIG. 10.

Referring now to FIG. 12, a bottom view of the embodiment in FIG. 11 is shown. Leg holes 110 and 111 from FIG. 11 comprise the ends of one leg receiver 115. Similarly, leg holes 112 and 113 comprise the ends of another leg receiver 116. A longitudinal axis runs through the midline of the modular bridging structure 40 from the first end 120 to the second end 130, through a center through hole 125. Leg receivers 115 and 116 are offset on opposing sides of this longitudinal axis. This offset configuration prevents long leg sections from hitting each other high above the modular bridging section 40. A user may desire particularly long leg sections in order to take slider shots many feet off the ground, as mentioned earlier. If the user wants to take shots lower to the ground, the user may use the same long leg sections, but position the modular bridging structure 40 lower, without having the top ends of the leg sections hit each other.

FIG. 13 shows two rail sections 42 received by three modular bridging structures 40 on one side. A small gap 150 exists between the two rail sections 42 in the middle of the rail channel 43, showing that one rail channel 43 can receive two ends of two rail sections 42. Users may use as many modular bridging structures as they desire in order to create slider tracks of varying lengths. Users will not be limited to standard lengths of existing commercially-available slider tracks, which are often limited to two, three, four, or feet in length.

The center through hole 125 can be used to attach the modular bridging structure 40 to various industry standard stands, some of which are known as JR and combo stands. Side through holes 135 can be used to mount other industry standard stands such as tripods or mono pods. In the present embodiment, there are two side through holes 135, but additional industry standard through holes are contemplated in other embodiments. Such standard mounting holes allow the modular bridging structure 40 to be used in various combinations with adjustable legs sections, JR stands, combo stands, mono pods, and tripods, which in turn allows users to maximize the equipment they already have. For example, if a user had a plurality of modular bridging structures 40, and a fixed amount of rail and leg sections, but decided on the set to extend the rails a bit longer, he or she could use the leg sections to create an extra length of rail, and substitute an industry standard tripod for the legs under one of the modular bridging structures.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A modular bridging structure, comprising
    a first end, a second end, a top side and a bottom side;
    a channel configured to receive a portion of an elongate rail, the channel being configured to receive the elongate rail substantially perpendicularly to a longitudinal axis of the modular bridging structure;
    a rail fastener securing the received rail within the channel;
    a leg receiver configured to receive an elongate leg section such that the leg section is attached through a bottom side of the modular bridging structure; and
    a leg fastener securing the received leg section to the modular bridging structure such that the securing point of the fastener is adjustable along a plurality of points along each leg section.

2. The modular bridging structure of claim 1, wherein the rail is received within the channel in an orientation where the rail passes from a front side to a back side of the modular bridging structure.

3. The modular bridging structure of claim 1, wherein the leg receiver is configured to receive an elongate leg such that the leg passes through the bottom side and the top side of the modular bridging structure.

4. The modular bridging structure of claim 3, wherein there are two leg receivers, each configured to receive one leg.

5. The modular bridging structure of claim 4, wherein the leg receivers are offset from each other on opposite sides of the longitudinal axis.

6. The modular bridging structure of claim 4, wherein the two leg receivers receive the legs such that the legs are substantially parallel to each other.

7. The modular bridging structure of claim 1, wherein the channel that is configured to receive an elongate rail can receive two ends of two separate rails.

8. The modular bridging structure of claim 1, wherein there are a plurality of receivers for receiving legs of the same length, wherein;
leg fasteners fixedly secure legs of the same length.

9. The modular bridging structure of claim 1, wherein the leg receiver is between one and two inches in diameter.

10. The modular bridging structure of claim 1, wherein the channel configured to receive elongate rail sections is between one and two inches in diameter.

11. The modular bridging structure of claim 1, wherein the rail fastener is a screw.

12. The modular bridging structure of claim 1, wherein the leg fastener is a thumb screw.

13. The modular bridging structure of claim 1, wherein the modular bridging structure is comprised of anodized aluminum.

14. The modular bridging structure of claim 1, wherein the modular bridging structure has a plurality of thorough holes configured to attach to devices selected from among a JR stand, a combo stand, a monopod, and a tripod.

15. The modular bridging structure of claim 1, wherein the modular bridging structure has a bubble level.

16. A system for mounting a camera, the system comprising
at least two modular bridging structures,
wherein each modular bridging structure comprises channels for receiving rails and leg receivers for receiving legs at a bottom of the modular bridging structure to receive an elongate leg section which is adjustable along a plurality of points along each leg section,
at least two rails attached to the bridging structures,
at least two legs comprising the elongate leg section attached to each of the at least two bridging structures;
wherein each of the legs is independently adjustable in height from the others,
a camera-mounting wheeled tray configured to roll along the rails; and
a camera.

17. The system of claim 16, including the camera-mounting wheeled tray having a friction brake.

18. The system of claim 16, including
the camera-mounting wheeled tray having a plurality of holes for mounting various sizes of cameras and accessories.

19. The system of claim 16, including the camera-mounting wheeled tray having safeties.

20. The system of claim 16, wherein
Any of the rails or legs are comprised of anodized aluminum.

\* \* \* \* \*